(12) United States Patent
Peumans et al.

(10) Patent No.: US 11,471,887 B2
(45) Date of Patent: Oct. 18, 2022

(54) MICROFLUIDIC DISTRIBUTION SCHEME

(71) Applicant: IMEC VZW, Leuven (BE)

(72) Inventors: Peter Peumans, Herfelingen (BE); Benjamin Jones, Kessel-Lo (BE); Nicolas Vergauwe, Borgloon (BE)

(73) Assignee: IMEC VZW, Leuven (BE)

( * ) Notice: Subject to any disclaimer, the term of this patent is extended or adjusted under 35 U.S.C. 154(b) by 213 days.

(21) Appl. No.: 16/693,750

(22) Filed: Nov. 25, 2019

(65) Prior Publication Data

US 2020/0197937 A1    Jun. 25, 2020

(30) Foreign Application Priority Data

Dec. 20, 2018  (EP) .................................... 18214486

(51) Int. Cl.
   *B01L 3/00*    (2006.01)
(52) U.S. Cl.
   CPC ... *B01L 3/502746* (2013.01); *B01L 3/502715* (2013.01); *B01L 2200/16* (2013.01); *B01L 2300/0883* (2013.01); *B01L 2400/06* (2013.01); *B01L 2400/084* (2013.01)
(58) Field of Classification Search
   CPC ... G01N 1/10; B01J 10/00; B01L 3/00; B01L 3/502746; B01L 3/502715; B01L 2200/16; B01L 2200/18; B01L 2300/0883; B01L 2400/06; B01L 2400/084
   See application file for complete search history.

(56) References Cited

U.S. PATENT DOCUMENTS

| | | | |
|---|---|---|---|
| 6,213,151 | B1 | 4/2001 | Jacobson et al. |
| 2002/0048536 | A1 | 4/2002 | Bergh et al. |
| 2005/0214184 | A1 | 9/2005 | Chambers et al. |
| 2006/0211933 | A1* | 9/2006 | Zimmermann .... A61B 5/14514 600/366 |
| 2016/0121291 | A1 | 5/2016 | Moonen | |

OTHER PUBLICATIONS

European Search Report, European Patent Application No. 18214486. 5, dated May 28, 2019, 8 pages.

* cited by examiner

*Primary Examiner* — Brian J. Sines
(74) *Attorney, Agent, or Firm* — McDonnell Boehnen Hulbert & Berghoff LLP

(57) ABSTRACT

A microfluidic device comprising a plurality of microreactors is provided. Each microreactor includes at least a first inlet and a second inlet for supplying a first fluid and a second fluid, respectively, to said microreactor and at least one waste channel for draining fluid from said microreactor. The device further comprises a shared first microfluidic supply system for supplying a first fluid to the first inlets of the plurality of microreactors, a shared second microfluidic supply system for supplying a second fluid to the second inlets of the plurality of microreactors. At least one of said inlets to each microreactor comprises at least one valve-less fluidic resistance element having a fluidic resistance that is substantially larger than the fluidic resistance of the corresponding shared microfluidic supply system. A chemical reaction sequencer apparatus including the microfluidic device and a method for supplying reagents to a plurality of microreactors are also provided.

20 Claims, 5 Drawing Sheets

MICROFLUIDIC DISTRIBUTION SCHEME

CROSS-REFERENCE TO RELATED APPLICATIONS

The present application is a non-provisional patent application claiming priority to European Patent application no. 18214486.5, filed Dec. 20, 2018, the contents of which are hereby incorporated by reference in their entirety.

FIELD OF THE DISCLOSURE

The presently disclosed concept relates to the field of microfluidic devices and fluid transport in microchannels. More particularly it relates to a microfluidic device allowing accurate control of reagents input and outflow so that high purity reactions can be obtained.

BACKGROUND OF THE DISCLOSURE

Microfluidic devices have been developed for a variety of applications in for example chemistry and biology and can be used for manipulating extremely small volumes of fluids, such as at the nanoliter level or below. One application involves the use of microfluidic devices to perform chemical reactions in a vast number of microreactors located in the microfluidic device, such as on a microfluidic chip.

DNA sequencing will be discussed in some detail to provide background of one potential application of the present disclosure. However, it will be understood that the DNA sequencing is not the only potential application of the present disclosure.

In whole genome sequencing, it may be desirable to know the sequence of the nucleotides in a patient's DNA. There are a number of techniques for determining the DNA sequence. DNA sequencing by synthesis is an example of a class of techniques that works by taking a single-stranded DNA (ssDNA) template and building the double-stranded DNA (dsDNA) molecules by incorporating the nucleotides adenine (A), cytosine (C), guanine (G), and thymine (T) in a particular order by a reaction. The incorporation of a nucleotide into the ssDNA produces pyrophosphate (PPi), which may be detectable using a number of methods. Pyrosequencing, for example detects light emitted during a sequence of enzymatic reactions with the PPi. So in order to determine which nucleotide is incorporated into the ssDNA, each nucleotide is typically introduced one at a time into the reaction chamber at high levels of purity. Otherwise, an incorrect read of the nucleotide being incorporated might occur.

To perform whole genome sequencing by synthesis, the DNA may be split into small fragments, each containing typically a few hundred or a few thousand base-pairs. These fragments can then be spread over a large number of reactors so that the process of sequencing can be massively parallelized. To give the reader some sense of scale, there are approximately 3 billion base-pairs in the human genome so 3 million reactor cavities are nominally required if the DNA is fragmented into 1000 base-pair segments and each reactor contains a distinct, different DNA fragment. In practice, more reactions are required to ensure good data integrity when piecing back together the DNA from reading the nucleotide sequence from the multiple DNA fragments. Furthermore, it can be difficult to ensure that each reactor is loaded with a distinctly, different fragment of the whole genome.

The classical technology for whole genome sequencing utilizes a relatively large flow cell which contains a large number of reaction cavities. The ssDNA template fragments are typically either covalently bound directly to the surface of each reaction cavity or bound to beads that are placed into each reaction cavity. Because the flow cell can be large, it can take some time to fill the flow cell with a nucleotide and then to evacuate the flow cell of the nucleotide using a wash buffer before introduction of the next nucleotide. Thus, the rate at which nucleotides can be introduced and incorporated into the ssDNA can be relatively slow. Also, the sequencing operation typically employs a large number of reagents.

The process of introducing the reagents sequentially can be sped up by introducing the separate reagent inlets and outlet channel very close to each reaction chamber by using microfluidic channels. However, preventing diffusion of unwanted reagents (nucleotides in the case of DNA sequencing) into the reaction chamber can be a problem as it can reduce the purity of reagents and can cause unwanted reactions to occur (e.g., incorporation of the wrong nucleotide in the case of DNA sequencing).

Controlling fluid behaviour in small channels to supply reagents and buffer solutions to microreactors present in the fluidic device can be a challenge. Solutions exist that take into account both the physical properties of the fluid, the contents of the fluid and the dimensions of the micro fluidic channels.

Further, unidirectional fluidic transport at the microlevel may not be straightforward, especially in the case when a microreactor in a microfluidic device may be provided by two or more inlets. When a liquid from one channel is pumped towards the microreactor, pressure can build up in the microreactor and can cause a counter-pressure in one or more of the other channels. In many cases, backpressure that leads to back flow in these channels is undesired. This is particularly the case when different reagents are provided to the microreactor by means of the microchannel network. Contamination of these reagents and/or formation of by-products of the microreactor in the microchannel network may lead to undesirable effects.

The use of microvalves is one way to solve the backpressure issue. Each microchannel may then be controlled by one or more microvalves in order to direct the liquid flow. Despite its widespread use, microvalves require additional microfabrication steps making the microfluidic device more complex and thus costly. In addition, extra control interfaces may be required for these values, thus increasing the requirements on the total instrumentation as well. Additionally, the presence of valves requires a control system for opening and closing the valves, which also increases the complexity, size and cost of the microfluidic system. Valves usually require mechanical parts, which may be prone to failure and reduces resilience of the system. Additionally, opening and closing the valves take time, which can increase operation times.

Hence, there is a need in the art for improved devices and method for decreasing the risk of contamination within microchannels in a microfluidic device.

SUMMARY OF THE DISCLOSURE

It is an object of the disclosure to at least partly overcome one or more limitations of the prior art. In particular, it is an object to provide a microfluidic device for decreasing the risk of contamination within microchannels.

As a first aspect of the disclosure, a microfluidic device is provided. The microfluidic device comprises a plurality of microreactors, wherein each microreactor comprises at least a first and a second inlet for supplying a first and a second fluid, respectively, to said microreactor and at least one waste channel for draining fluid from said microreactor, wherein the device further comprises a shared first microfluidic supply system for supplying a first fluid to the first inlets of the plurality of microreactors; and a shared second microfluidic supply system for supplying a second fluid to the second inlets of the plurality of microreactors, wherein at least one of said inlets to each microreactor comprises at least one valve-less fluidic resistance element having a fluidic resistance that is substantially larger than the fluidic resistance of the corresponding shared microfluidic supply system.

The microfluidic device may be configured for allowing multiple chemical reactions to be performed simultaneously in the device. The microfluidic device may comprise several microchannels for transporting fluid and reagents in the device. As an example, the microfluidic device may be a lab-on-a-chip device that allows automation and high-throughput screening. The microfluidic device may thus have a footprint that is less than a few square centimetres. The microfluidic device may be configured to handle small volumes of liquid, such as nanoliter volumes or picoliter volumes. The microfluidic device may be a device that is configured to control and manipulation of fluids that may be geometrically constrained to a small, typically sub-millimeter, scale.

The microfluidic device may be adapted for performing sequencing by chemical synthesis.

The microfluidic device may thus comprise multiple microreactors, such as more than 100 microreactors, such as more than 1000 microreactors, such as more than 10,000 microreactors. The microreactor may be configured for allowing a chemical reaction to take place within the microreactor, such as within one or several microchambers within the microreactor. A microreactor comprises at least a first and a second inlet for supplying a first and a second fluid, respectively, to said microreactor and at least one waste channel for draining fluid from said microreactor. There may also be a shared first microfluidic supply system for supplying a first fluid to the first inlets of the plurality of microreactors and a shared second microfluidic supply system for supplying a second fluid to the second inlets of the plurality of microreactors. A shared microfluidic supply system may thus be used for supplying a fluid, such as reagents or buffer, simultaneously to inlets of all microreactors. The shared microfluidic supply system may comprise supply channels, such as a single supply channel or more than one supply channel.

An inlet to a specific microreactor may be a portion of the supply system in which a fluid, when being supplied downstream, can only reach that specific microreactor. Thus, in the shared microfluidic supply system, a fluid can reach at least two microreactors, whereas in an inlet, the fluid can only reach a single microreactor.

In embodiments of the first aspect of the disclosure, the first inlets cab be arranged in parallel so that the plurality of microreactors can be simultaneously addressed by the first inlets and wherein said second inlets can be arranged in parallel so that the plurality of microreactors can be simultaneously addressed by the second inlets.

It is also to be understood that a microreactor may comprise more than two inlets, such as a third inlet for supplying a third fluid and a fourth inlet for supplying a fourth fluid to the microreactor, and so on. As an example, a microreactor may comprise more than five inlets. Consequently, the microfluidic device may comprise a shared third microfluidic supply system for supplying a third fluid to the third inlets of the plurality of microreactors and a shared fourth microfluidic supply system for supplying a fourth fluid to the fourth inlets of the plurality of microreactors. Such third and fourth inlets may also be arranged in parallel as discussed in relation to the first and second inlets above.

Furthermore, the inlets to each microreactor comprises at least one valve-less fluidic resistance element having a fluidic resistance that is substantially larger than the fluidic resistance of the corresponding shared microfluidic supply system. As an example, the first inlet may comprise a valve-less fluidic resistance element having a fluidic resistance that is higher than the fluidic resistance of the first microfluidic supply system, and the second inlet may comprise a valve-less fluidic resistance element having a fluidic resistance that is higher than the fluidic resistance of the second microfluidic supply system, etc. As an example, all inlets of the microreactors may comprise at least one valve-less fluidic resistance element having a fluidic resistance that is substantially larger than the fluidic resistance of the corresponding shared microfluidic supply system.

A valve-less fluidic resistance element refers to a fluid element that does not comprise a valve for creating the higher fluidic resistance. An inlet may comprise a single valve-less fluidic resistance element or at least two valve-less fluidic resistance element.

In embodiments, the at least one valve-less fluidic resistance element can be arranged to decrease the diffusion rate of reagents to and from the inlet. The diffusion may be decreased by arranging the valve-less fluidic resistance element with a certain volume.

Further, in embodiments, the at least one valve-less fluidic resistance element can be arranged to increase the fluidic resistance of the inlet.

In embodiments, the at least one valve-less fluidic resistance element can be arranged to both decrease the diffusion rate of reagents to and from the inlet and to increase the fluidic resistance of the inlet.

The fluidic resistance refers to a fluid friction force acting opposite the flow of the fluid in the inlet.

It is understood in the art that the fluidic resistance of a fluidic resistance element can be realized using a channel whereby the cross sectional dimensions of the channel can be adjusted, with smaller dimensions leading to a higher fluidic resistance, along with the length of the channel, with long lengths leading to a higher fluidic resistance. It is also understood that a fluidic resistance element can be composed of other structures such as, but not limited to, micropillar arrays or other porous materials that increase the frictional losses and restricts the motion of the fluid.

The first aspect is based on the insight that including fluidic resistance elements at the inlets can allow for a valve-less approach for decreasing the risk of contamination between reagents used in the inlets. Thus, the risk of contamination within the microfluidic device can be reduced. This is further explained in the detailed description below. The microfluidic device of the first aspect can also facilitates the use of a vast number of microreactors in the device and supply and use of high purity reagents to such vast numbers of microreactors.

Consequently, the microfluidic device of the first aspect may reduce the need for microvalves for solving problems related to backpressure during supply of reagents to the microreactors.

In embodiments of the first aspect of the disclosure, the plurality of microreactors may be connected in parallel to the shared microfluidic supply systems so that a higher pressure may be applied to the inlets of an upstream microreactor than to the inlets of a downstream microreactor during supply of a first or second fluid via the shared microfluidic supply systems.

Thus, the microreactors may be arranged in the microfluidic device so that there is a fluidic pressure drop from the inlets of an upstream microreactor to the inlets a downstream microreactor.

In embodiments of the first aspect, the first and/or second shared microfluidic supply system comprises a valve for controlling the supply of fluid to said first and/or second inlets and wherein said valve is arranged upstream of said inlets.

Thus, the at least two inlets may be free of any valve and/or pumping mechanism for controlling the flow of fluid in the inlet.

In addition, there may be one or several pumps for supplying the fluid to the first and second inlets via the valves.

Due to the configuration of the microfluidic device according to the first aspect, the valves and the pumps may be arranged outside the microfluidic device itself. This decreases the footprint of the microfluidic device. Thus, the valves and the pumps may be external valves or pumps. Consequently, in embodiments, the microfluidic device may be free of any valves or pumps for supplying fluid to the shared microfluidic supply systems, but may be configured for receiving supply of fluid via external valves and/or pumps.

The higher fluidic resistance at the inlet as compared to the shared supply channel may be created in several ways. In embodiments of the first aspect, the valve-less fluidic resistance element comprises an elongated fluid path, the larger fluidic resistance being created by the elongated fluid path.

An elongated fluid path may thus be a fluid path that is longer than a straight connection from the shared microfluidic supply system to the microreactor.

As an example, the elongated fluid path may be formed by the inlet comprising a winding fluid path.

The fluid path for the fluid supplied by the shared common microfluidic supply system may thus be different in at the inlet than in the shared supply channel. The fluid path may thus be more curved at the inlet than in the shared supply channel.

As an example, the winding fluid path may comprise at least two 180 degree turns. The winding fluid patch may thus be twisting and changing direction, such as changing direction at least 180 degrees, at least two times, such as at least four times.

As an example, the elongated fluid path may be formed by a rectangular waveform or a square waveform of the inlet.

Thus, the inlet may form at least one fluid channel having a non-sinusoidal waveform, causing the fluid to change direction several times before reaching the inlet. The elongated fluid path of the fluid channel may for example form a rectangular wave form, a square wave form or a triangle wave form. The elongated fluid path of the fluid channel may for example form a zigzag pattern at the inlet.

The higher fluidic resistance at the inlet as compared to the shared supply channel may be also be created by having a narrower fluid path. Thus, in embodiments of the first aspect, the valve-less fluidic resistance element may have a smaller cross-sectional area compared to the cross-sectional area of the shared microfluidic supply system, the larger fluidic resistance being created by the smaller cross-sectional area.

In embodiments of the first aspect, the valve-less fluidic resistance element may be a porous element, the larger fluidic resistance being created by the porosity of the valve-less fluidic resistance element.

In embodiments of the first aspect, the valve-less fluidic resistance element comprises a flow resistance element having a first fluidic resistance, wherein the first fluidic resistance may be larger than the fluidic resistance of the corresponding shared microfluidic supply system.

Further, in embodiments of the first aspect the valve-less fluidic resistance element comprises a diffusion plug arranged to increase the diffusion rate of reagents at the inlet.

The diffusion plug may be arranged to increase the diffusion rate of reagents and may thus have some substantial volume but does not necessarily have to increase the fluidic resistance. An inlet may thus comprise only a flow resistance element, only a diffusion plug, or both a flow resistance element and a diffusion plug.

In embodiments of the first aspect, the valve-less fluidic resistance element comprises a flow resistance element having a first fluidic resistance and a diffusion plug having a second fluidic resistance, wherein said first fluidic resistance may be larger than the second fluidic resistance.

Having both a flow resistance element and a diffusion plug may thus decrease the risk of contamination even more, and may be used in applications requiring the highest purity of reagents. Having only one of the flow resistance element and the diffusion plug may be for application in which the requirements for purity is not as high.

Both the fluidic resistance of the flow resistance element and the diffusion plug may be larger than the fluidic resistance of the shared microfluidic supply system.

As an example, the diffusion may be arranged downstream of said flow resistance element.

Further, the flow resistance element and/or the diffusion plug may comprise a winding fluid path. These winding fluid path or paths may thus form the winding fluid path of the valve-less fluidic resistance element, as discussed above. As an example, the winding fluid path of the flow resistance element and/or the diffusion plug may comprise at least two 180 degree turns. As a further example, the winding fluid path of the flow resistance element and/or the diffusion plug may be formed by the flow resistance element and/or the diffusion plug having a rectangular waveform or a square waveform.

Furthermore, the channel cross-section of the diffusion plug may be larger than the channel cross-section of the flow resistance element. The larger cross-section may thus give the diffusion plug a lower fluidic resistance than the flow resistance element.

A larger fluidic resistance of the flow resistance element may also be created by having a porous flow resistance element and a non-porous diffusion plug, or having a diffusion plug with a porosity so that the fluidic resistance may be lower than that of the porous flow resistance element.

In embodiments of the first aspect, the microfluidic device comprises a drain arranged between valve-less fluidic resistance elements and their respective microreactors. As an example, the drain may be a common drain for a plurality of microreactors.

The drain may be for removing contaminants stuck in the valve-less fluidic resistance element, such as for removing contaminants stuck in a diffusion plug. The drain may thus be for removing contaminants before they reach the microreactor.

Furthermore, the common drain may be in fluid connection with a common drain channel, wherein the drain channel comprises a common drain valve for switching at least one common drain between an open and a closed state.

The drain may be connected to an operable valve that may be switched between two states; an open state in which fluid in the drain may be prevented from reaching the microreactors and drained via the drain; and in a closed state in which fluid in the drain may reach the microreactors. One or several, such as all, common drains may be arranged to be operated using a single common drain valve.

In embodiments of the first aspect, the different shared microfluidic supply systems may be manufactured in different layers in the microfluidic device.

The microfluidic device may thus comprise multilevel fluidics that may be bonded to a single chip, such as to a silicon chip.

In embodiments of the first aspect, the waste channels for draining fluid from said microreactors may be in fluid connection with a common waste channel.

To remove waste, a network of channels can be used to connect to the waste channel for draining fluid from the microreactors.

Further, the common waste channel may comprise a common waste valve for switching the plurality of microreactors between an open and a closed state.

However, the common waste channel may also be an open waste channels comprising no valve.

Thus, one or several, such as all, waste channels and thus all microreactors, may be adapted to be controlled by a single valve downstream of the microreactors.

The microfluidic device may comprise several layers of fluidics, and the shared inlet channels may be in present in the same fluidic layer.

As a second aspect of the disclosure, a method is provided for supplying reagents to a plurality of microreactors comprising the steps of a) providing a microfluidic fluidic device according to the first aspect above, wherein the valve-less fluidic resistance element comprises a flow resistance and a diffusion plug and further wherein a common drain is arranged between valve-less fluidic resistance elements and their respective microreactors;

b) supplying a first reagent to the microreactors via a first inlet;

c) supplying cleaning solution to all inlets and collecting and removing said cleaning solution in the drain before reaching said microreactors;

d) supplying a cleaning solution to the drain via an inlet other than the first inlet and filling said microreactors with cleaning solution;

e) removing fluid in the drain and reloading said diffusion plugs with cleaning solution; and f) supplying a second reagent to the microreactors via a second inlet.

The method of the second aspect may thus allow for a first and second reagent to reach the microreactors with a flush protocol in between. Thus, step c), step d) and step e) form a three-step flush protocol.

In step c), there is a flush of the valve-less fluidic resistance element, such as a flush of diffusion plugs present at the inlets. The common drain may thus be operable using a drain valve and the drain valve may be in an open state during step c).

In step d), there is a drain and microreactor cleaning flush. This step may comprise keeping the drain valve open to allow the drain to be filled with cleaning solution before closing the drain valve to let the microreactors be filled. In step d), the cleaning solution may thus reach the microreactors and be drained from the microreactors using the waste channels. The common drain may thus, after the drain has been filled, be switched to a closed state.

In step e), the waste of the microreactors may be closed and the drain briefly opened. This may allow removal of spillover caused by parasitic and diffusion flows in the drain. Then, one inlet to which the cleaning solution is not supplied is opened to allow for the diffusion plugs being reloaded with cleaning solution.

The cleaning solution may be a buffer solution.

In step f) a second reagent may be supplied to the microreactors.

The method of the second aspect thus allows for restoring the inlets and drain to the same initial condition between supply of different reagents.

BRIEF DESCRIPTION OF THE DRAWINGS

The above, as well as additional objects, features and advantages of the presently disclosed concept, will be better understood through the following illustrative and non-limiting detailed description, with reference to the appended drawings. In the drawings like reference numerals will be used for like elements unless stated otherwise.

DETAILED DESCRIPTION OF THE DISCLOSURE

Figure 1:
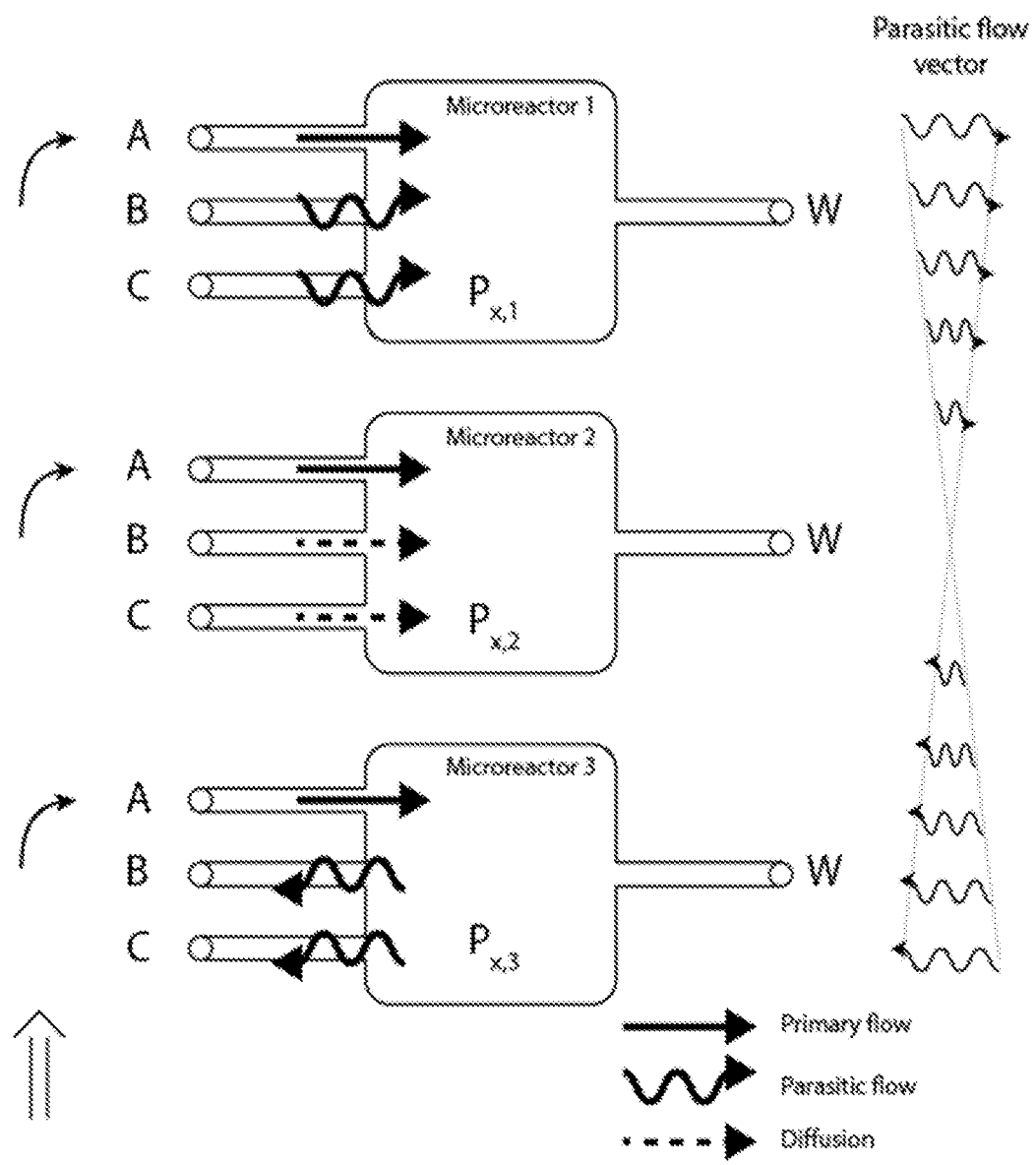
FIG. 1 is an illustration of a conventional fluidic solution for supplying reagents to different microreactors of a microfluidic device.

For a better understanding of the present disclosure, contamination problems that may arise within prior art microfluidic devices are discussed in relation to FIG. 1, which schematically illustrates a prior art configuration of a microfluidic device comprising three microreactors that may be simultaneously addressed (i.e. parallel configuration) by three inlets (A, B and C) and that share a common waste channel W. Because the three microreactors may be connected in parallel, each channel inlet may be connected by means of a shared microfluidic channel (channel configuration not shown). Each channel may contain a certain fluidic species and may be controlled by an external valve and pumping mechanism (not shown). Each of the three channels may be subjected to the same external pressure. Because the microreactors may be connected in parallel, the upstream microreactor may have a higher pressure that the downstream microreactors. The pressure at a specific channel inlet is denoted by $P_{x,y}$ for which x refers to the channel ID and y for the microreactor ID.

In the case where a pressure is applied at channel A, and channels B and C may be valved or closed off, three types of mass transport may be observed (see arrows in FIG. 1). First, the primary flow of species A may cause each microreactor to become filled with species A. The previous species present in the reactors may be replaced and drained via the common waste channel. Secondly, secondary or parasitic flows may be observed at several inlets. These parasitic flows may be caused by pressure differences at the inlets which may, in turn, be caused by the fluidic resistance of the channels that connect the inlets. As a consequence, $P_{A,3}$ may be higher than $P_{A,2}$ which in turn may be higher than $P_{A,1}$. Depending on the number of microreactors (in this example 3) and their configuration, a parasitic flow vector can be theoretically deducted. For this particular configuration, part of the content of microreactor 3 may flow to microreactor 1 via channels B and C. Since there may be no individual valves at the different reactor inlets, these parasitic flows may contaminate the channel inlets B and C of microreactor 3 in overpressure while liquid from the other channel inlets may leak into microreactor 1. The parasitic flows towards and from microreactor 2 may be leveled out resulting in a zero net flow. However, there may be small deviations in fluidic resistance between the difference microreactors due to small deviations in channel dimensions caused by the production process.

Depending on these differences, there may be a small parasitic in-flow or out-flow in channels B and C of microreactor 2. Even in the theoretical scenario when parasitic flows may be absent in microreactor 2, there may still be reagent contamination in microreactor 2 due to a third type of mass transport caused by diffusion. Note that diffusion may also be present in microreactors 1 and 3, but depending on the pressure differences, this effect may be neglected if the parasitic flow is large enough. In many instances, there may be a need for sequentially applying different reagents in a microreactor which come from different channels, such as sequencing-by-synthesis. As described above, the prior art solution of FIG. 1 may give rise to unwanted contamination effects impacting the performance of the chemical reactions in the microreactor. Furthermore, even in the absence of parasitic flows, intrinsic diffusion effects may cause the different species located in the different inlets to diffuse into the reaction vessel. Again, as no valves may be present at each channel inlet to stop this undesired effect, this may cause contamination in the microreactor.

Embodiments of the disclosure will now be described more fully hereinafter with reference to representative FIGS. 2-5, in which some, but not all, embodiments of the disclosure are shown. The disclosure may be embodied in many different forms and should not be construed as limited to the embodiments set forth herein.

Figure 2:
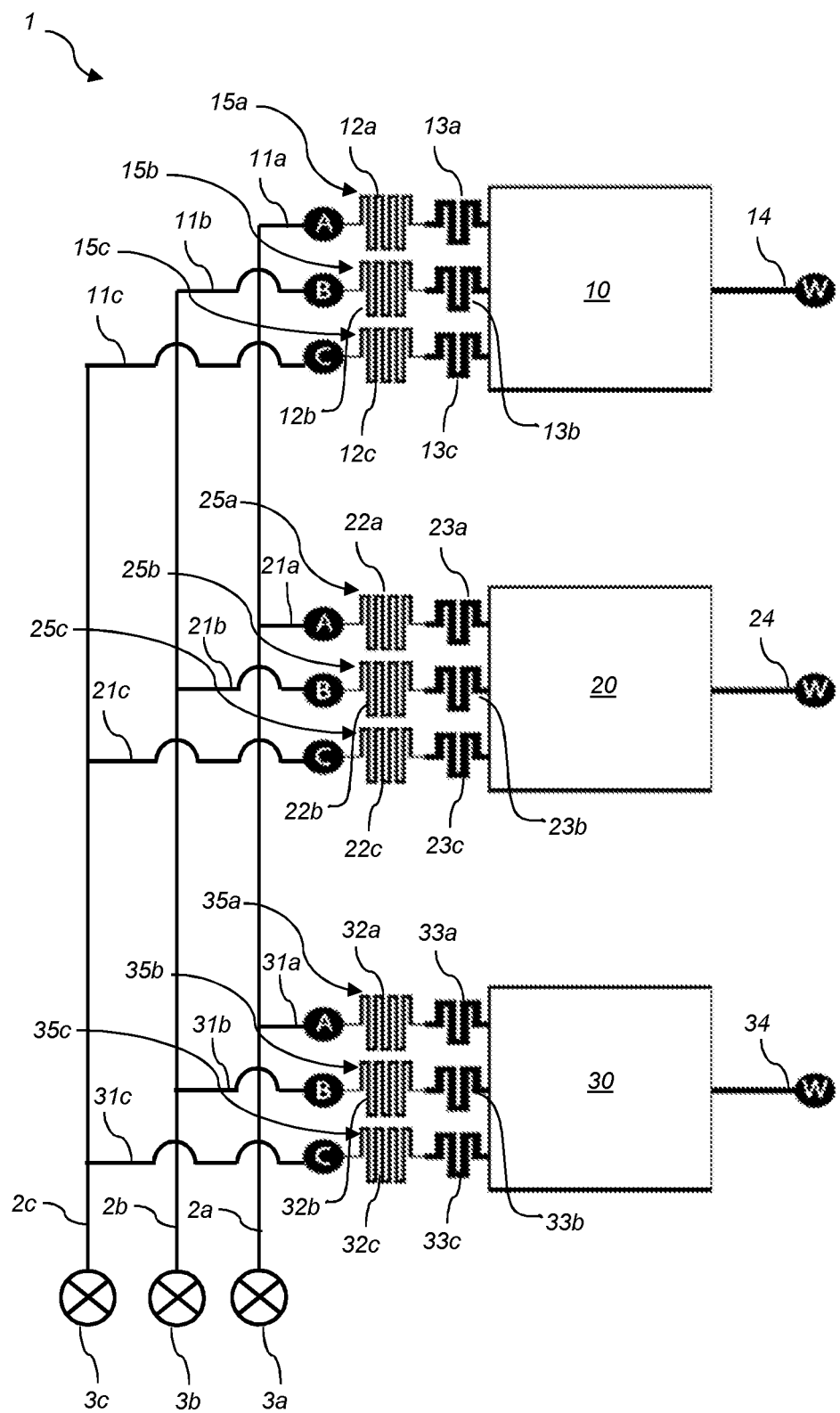
FIG. 2 is an illustration of a representative microfluidic device according to embodiments of the disclosure.

FIG. 2 shows an embodiment in which a representative microfluidic device 1 comprises three microreactors 10, 20, 30. The microreactors 10,20,30 may be in a parallel configuration so that they may be simultaneously addressed by a first 11a, 21a, 31a, a second 11b, 21b, 31b and a third 11c, 21c, 31c inlet for supplying a first, a second and a third fluid, respectively, to the microreactors. All first inlets 11a, 21a, 31a may herein also denoted inlets "A", all second inlets 11b, 21b, 31b may herein also denoted inlets "B" and all third inlets 11c, 21c, 31c may herein also denoted inlets "C" for convenience.

Further, inlets A may be in fluid communication with a shared first microfluidic supply system (2a) for supplying a first fluid to the first inlets A, inlets B may be in fluid communication with a shared second microfluidic supply system (2b) for supplying a second fluid to inlets B, and the inlets C may be in fluid communication with a shared third microfluidic supply system (2c) for supplying a third fluid to the inlets C. Each microreactor 10, 20, 30 may further comprise a waste channel (14, 24, 34) for draining fluid from said microreactor. These waste channels may be connected to form a common waste channel.

Each shared microfluidic supply system 2a, 2b, 2c may contain a certain fluidic species and each may be controlled by an external valve 3a, 3b, 3c and pumping mechanism (not shown). Each of the three channels may be subjected to the same external pressure. Because the microreactors 10, 20, 30 may be connected in parallel, the upstream microreactor 30 will have a higher pressure that the downstream microreactor 20, which in turn will have a higher pressure than the further downstream microreactor 10

In this embodiment valve-less fluidic resistance elements 15a, 15b, 15c, 25a, 25b, 25c, 35a, 35b, 35c having a fluidic resistance that may be substantially larger than the fluidic resistance of the corresponding shared microfluidic supply system (2a, 2b, 2c) may be introduced at the inlets 11a, 11b, 11c, 21a, 21b, 21c, 31a, 31b, 31c, prior to microreactor entrance. These valve-less fluidic resistance elements may consist of a flow resistance element 12a, 12b, 12c, 22a, 22b, 22c, 32a, 32b, 32c and a diffusion plug 13a, 13b, 13c, 23a, 23b, 23c, 33a, 33b, 33c.

The flow resistance elements may have in this embodiment a first fluidic resistance and the diffusion plugs may have a second fluidic resistance, and first fluidic resistance may be larger than the second fluidic resistance.

The fluidic resistance may for example be varied by changing the channel dimensions such as length, width and height.

The principle of the valve-less fluidic resistance elements may be built upon the explanation of the prior art example shown in FIG. 1. Suppose an initial situation in which all the diffusion plugs and microreactors are pre-filled with a buffer solution introduced via inlets C. A buffer solution may be an inert solution that does not cause any reaction in the microreactor. For example, it can be used to clean or reset the microreactor after a reaction took place. Now, reagent A may be pumped into the microreactors via inlets A. As a consequence:

Diffusion plugs 13a, 23a, 33a may get filled with species A as part of the primary reagent flow Diffusion plugs 33b and 33c of microreactor 30 may get partially filled with reagent A because of the parasitic flow Diffusion plugs 13b and 13c of microreactor 10 may leak some inert buffer solution into the reactor because of the parasitic flow. Since the buffer medium may be inert and leaked in tiny amount, the impact on the reaction inside the microreactor may be minimal.

By means of diffusive flow, minimal amounts of buffer solution may leak from diffusion plugs 23b and 23c into microreactor 20.

Depending on the fluidic resistance of the flow resistance elements 12a, 12b, 12c, 22a, 22b, 22c, 32a, 32b, 32c, more or less liquid may leave or enter the diffusion plugs. As a consequence, the amount of liquid that leaves or enters the diffusion plugs can be precisely controlled by controlling the fluidic resistance of each flow resistance element. Thus, contamination of different reagents during operation of the microfluidic device can be decreased.

Figure 3:
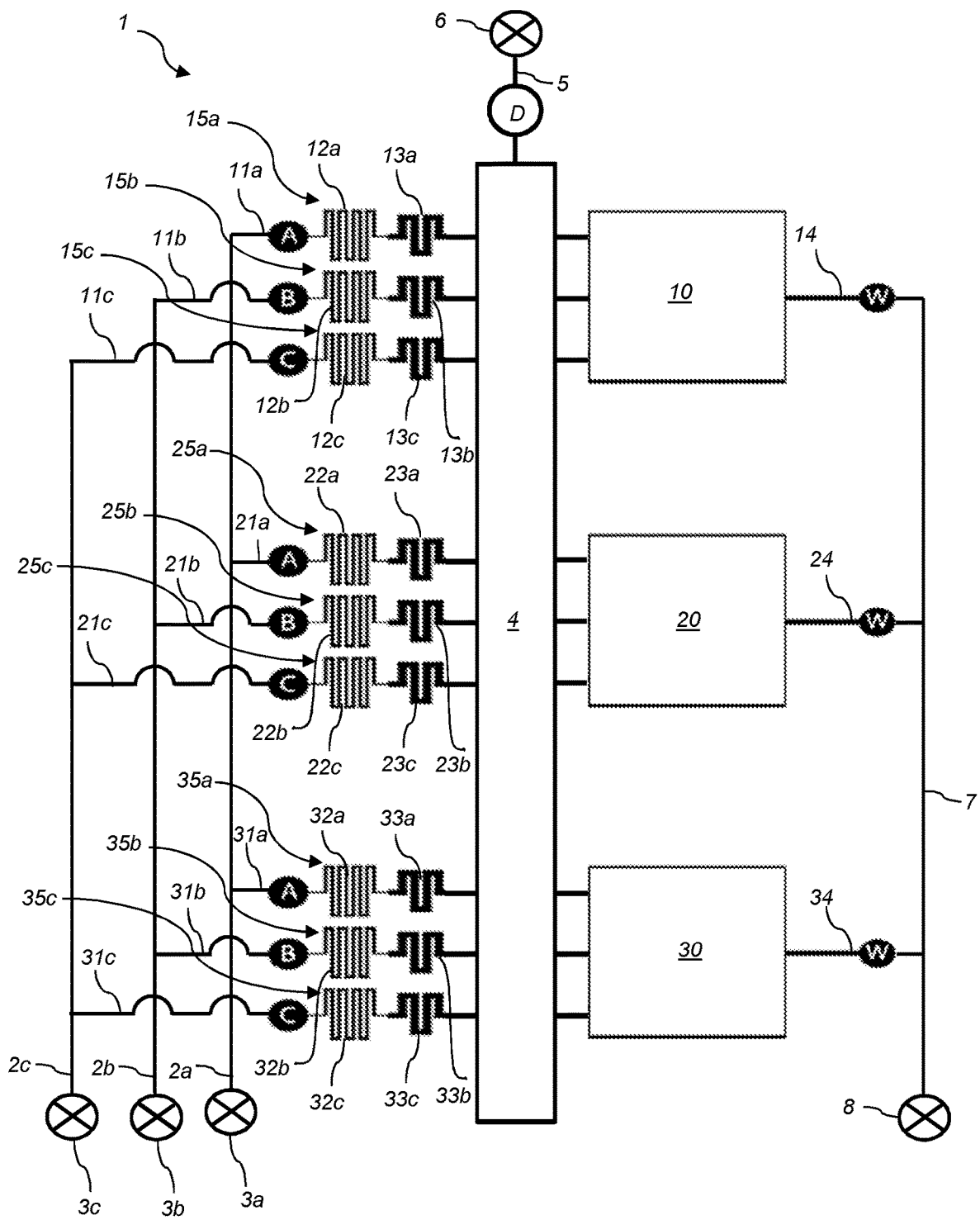
FIG. 3 is an illustration of a representative microfluidic device according to embodiments of the disclosure comprising a common drain.

FIG. 3 shows a further embodiment of the present disclosure. The microfluidic device 1 may be similar to the device described in relation to the embodiment of FIG. 2 above, but an additional microfluidic structure, a drain 4, may be introduced between the valve-less fluidic resistance elements 15a, 15b, 15c, 25a, 25b, 25c, 35a, 35b, 35c and their respective microreactors. Fluid collected in the drain 4 can be removed via drain channel 5 that may be opened and closed by means of drain valve 5. Further, the waste channels from the microreactors 14, 24, 34 may all connect in a common waste channel 7 that may be opened or closed using waste valve 8.

A similar situation occurs when reagent A is first flushed through the microreactors. The difference though is that buffer solution that leaks from diffusion plugs 13b1 and 13c of microreactor 1 and from 23b and 23c of microreactor 2 (by means of diffusion in an ideal scenario) may be collected in the drain 4 instead of in the microreactors. This eliminates any dilution of reagent A present in the microreactors.

Figure 4:
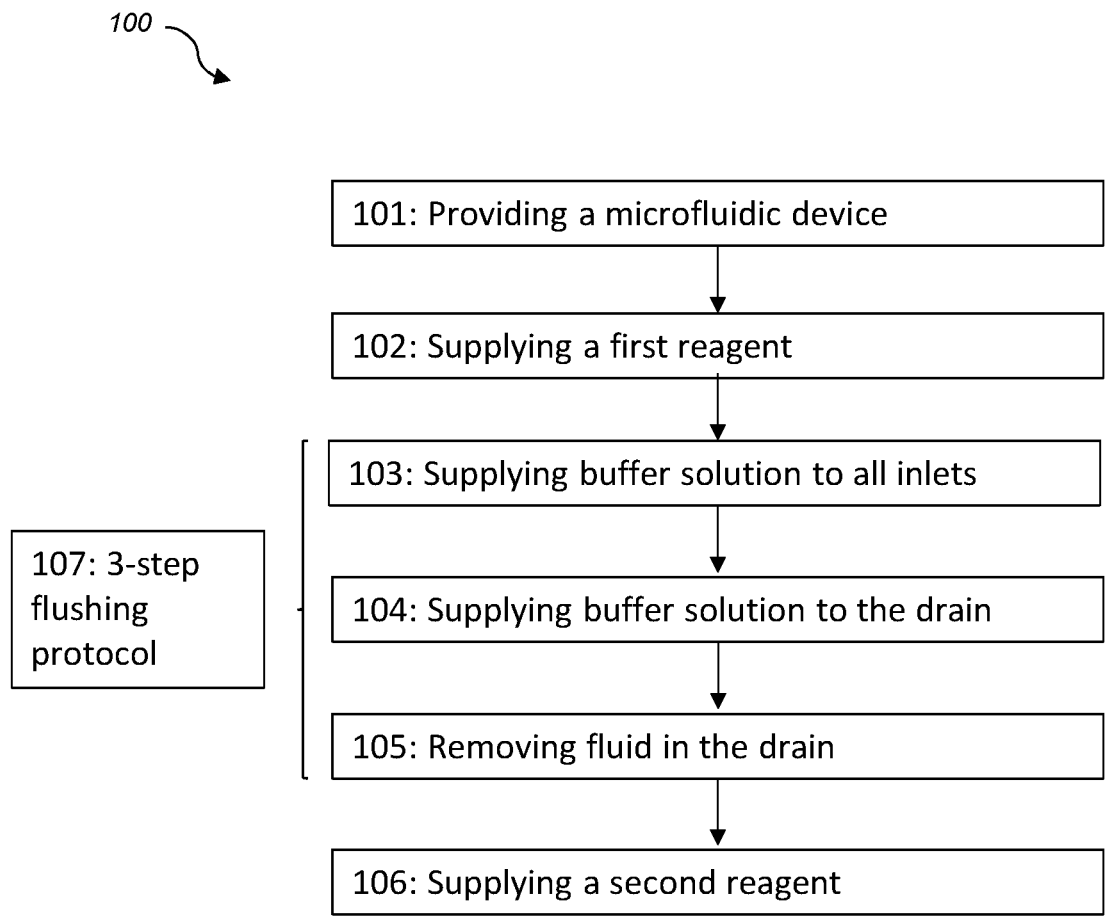
FIG. 4 is a schematic illustration of a method of the disclosure for supplying reagents to the microreactors and for a cleaning protocol that may be performed between supply of different reagents.

A method (100) for supplying reagents to the plurality of microreactors of the microfluidic device 1 of FIG. 3 may be schematically illustrated in FIG. 4.

First a microfluidic device may be provided 101 followed by a step of supplying 102 a first reagent to the microreactors via the inlets A.

Before another reagent channel is activated (for example inlets B and C), a 3-step flush protocol 107 may be performed. This protocol comprises a 'diffusion plug clean flush' comprising a first step of supplying 103 buffer solution to all inlets A, B and C and collecting and removing the buffer solution in the drain 4 before reaching said microreactors. Thus in step 103, all three channels may be simultaneously activated for a short time to clean the diffusion plugs that could contain reagents from the previous reagent flush (like diffusion plugs 33b and 33c). By activating all three channels simultaneously, unwanted parasitic flows may be suppressed. The liquids pumped into the channel network may be collected by the drain channel 5 and removed before they reach the microreactors.

The second step of the 3-step flush protocol 107 may be performed by supplying 104 buffer solution to the drain 4 via inlets C and filling said microreactors with buffer solution. This second step may thus involve a 'drain & microreactor cleaning flush' by activating channel C and keeping drain valve 6 open so the drain channel 5 may be filled with washing buffer. Once the drain channel 5 is cleaned and with channel C still activated, the valve 6 of the drain channel 5 may be closed and the waste valve 8 opened to fill the microreactors 10, 20, 30 with buffer. During this process, there may again be parasitic and diffusion flows like described in relation to FIGS. 2 and 3 above.

The third step of the 3-step flush protocol 107 may be performed by a step of briefly removing (105) fluid in the drain and reloading the diffusion plugs with buffer solution. This third step 105 may thus comprise a 'diffusion plug reload flush' in which buffer may still be supplied via channels C, the waste valve 8 is closed and the drain valve 6 briefly opened. This may remove the spillover caused by parasitic and diffusion flows in the drain channel 5. Then, with the buffer channel C still activated, valve 3a of channel A and valve 3b of channel B may be consecutively opened for a short period of time to allow the diffusion plugs to be reloaded with buffer solution to restore the capability of the diffusion plug.

After this three-step flushing cycle, the initial situation may be restored and a step of supplying (106) a second reagent to the microreactors via a second inlet, such as inlets B or C, can be initiated.

It should be noted that in-between these steps, it may be beneficial to briefly open the drain valve 6 if leakage would occur caused by parasitic or diffusion flows.

In embodiments, first and second reagents may be sequentially flushed through the microreactor with each time a buffer washing step in-between the two reagent flushes.

In still another embodiment, the order of sequential cycling between a first and second reagent may be altered, given the opportunity for more random, on-demand flushing sequences, but with each time a washing step in between. An example of such a random, on-demand flushing sequence could be: A, W, A, W, B, W, B, W, B, W, B, W, A, W, A, W, B, W, in which A is supply of a first reagent, W is supply of washing or buffer solution and B is supply of a second reagent.

The above embodiments have been discussed for a microfluidic device 1 having three microreactors. However, the amount of microreactors connected in parallel may be increased. As an example, the number of microreactors in the microfluidic device may be more than 10, such as more than 100, such as more than 1000. Equally possible, the number of inlet channels to each microreactor may be increased to perform more complex cycling processes.

Figure 5:
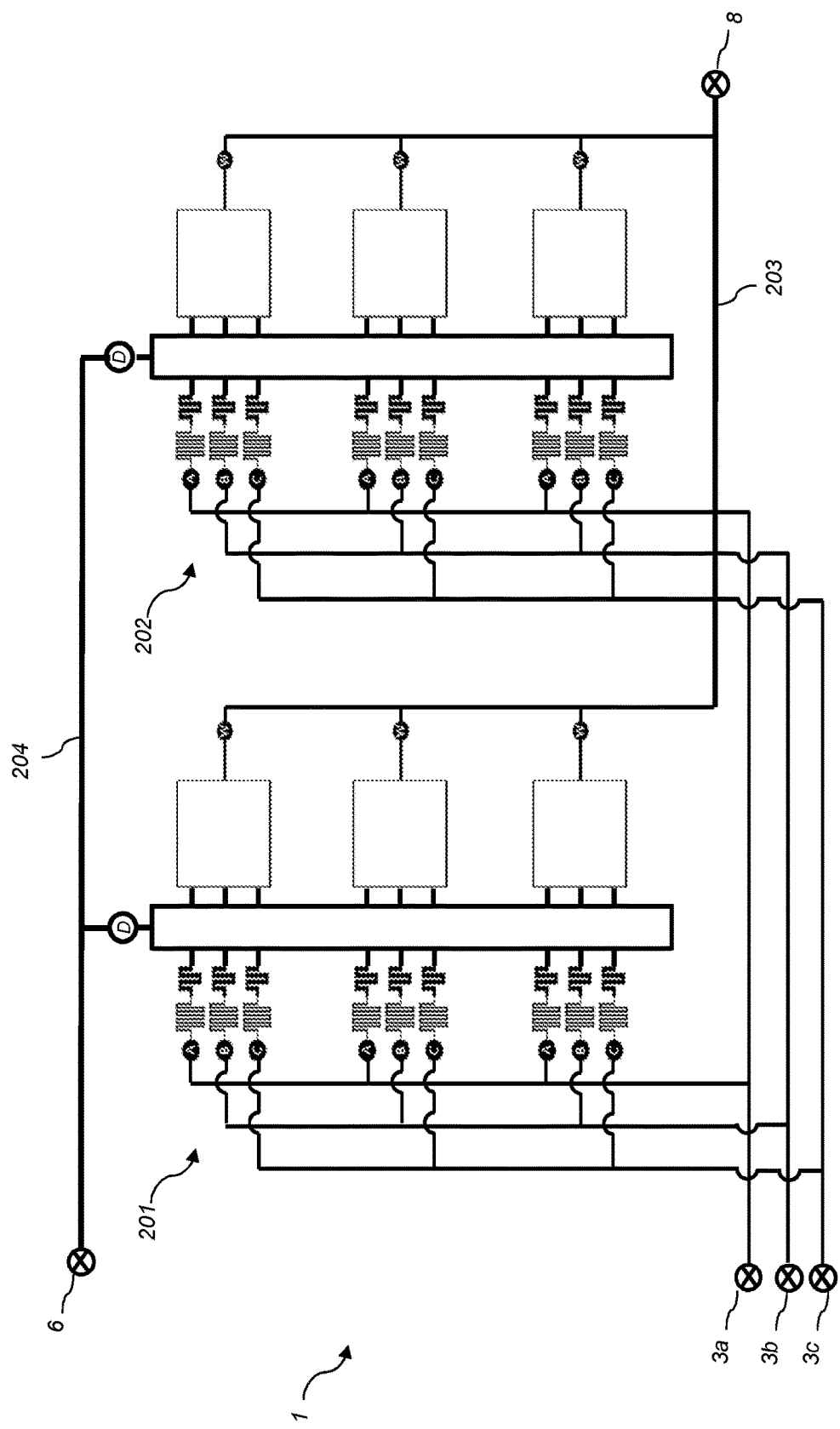
FIG. 5 is an illustration of a representative microfluidic device according to embodiments of the disclosure.

FIG. 5 shows an embodiment of a microfluidic device in which a plurality of microreactors may be arranged in clusters 201, 202. Microreactors in this example may be arranged in a first cluster 201 and a second cluster 202. It is to be understood that the microfluidic device may comprise several clusters, such as at least 10, such as at least 100, such as at least 100 of such clusters. Each cluster may comprise a column or array of microreactors. Both first and second clusters may be identical in terms of the number of microreactors. A cluster may comprise microreactors, inlet channels to each microreactor, and valve-less fluidic resistance elements as discussed above. The first and second clusters may each comprise the components as discussed in relation to the embodiment shown in FIG. 3 above, and have common waste and drain channels. The common waste channels from both clusters 201, 202 may combine in a general waste channel 203 that may be operable by a general waste valve 8, which thus controls emptying of all microreactors from both clusters. Further, the common drain channels from both clusters may combine in a general drain channel 204 that may be controlled by a general drain valve 6, which thus may be arranged to control the drains from both clusters. As seen in FIG. 5, there may be a single valve 3a for controlling the fluid supply to all inlets of type "A" in both clusters 201, 202, a single valve 3b for controlling the fluid supply to all inlets of type "B" in both clusters 201, 202 and a single valve 3c for controlling the fluid supply to all inlets of type "C" in both clusters 201, 202. Thus, a single valve may be used for addressing all first inlets, a single valve may be used for addressing all second outlets and so on.

The number of clusters 201, 202 of the device of FIG. 5 can be increased but still be operable using only inlet valves 3a, 3b, 3c, the drain valve 6 and the waste valve 8. These may be arranged outside the actual microfluidic device 1.

In the above the disclosed concept has mainly been described with reference to a limited number of examples. However, as is readily appreciated by a person skilled in the art, other examples than the ones disclosed above are equally possible within the scope of the disclosed concept, as defined by the appended claims.

The invention claimed is:

1. A microfluidic device comprising:
   a plurality of microreactors, each microreactor comprising at least a first inlet and a second inlet for supplying a first fluid and a second fluid, respectively, to said microreactor and at least one waste channel for draining fluid from said microreactor;

a shared first microfluidic supply system for supplying said first fluid to said first inlets of the plurality of microreactors; and a shared second microfluidic supply system for supplying said second fluid to said second inlets of the plurality of microreactors, wherein at least one of said first and second inlets to each microreactor comprises at least one valve-less fluidic resistance element having a fluidic resistance that is substantially larger than a fluidic resistance of a corresponding shared microfluidic supply system.

2. The microfluidic device according to claim 1, wherein said first inlets are arranged in parallel so that said plurality of microreactors are simultaneously addressed by the first inlets and wherein said second inlets are arranged in parallel so that said plurality of microreactors are simultaneously addressed by said second inlets.

3. The microfluidic device according to claim 1, wherein said plurality of microreactors are connected in parallel to said shared microfluidic supply systems so that a higher pressure is applied to said first and second inlets of an upstream microreactor than to said first and second inlets of a downstream microreactor during supply of said first or second fluid via said shared microfluidic supply systems.

4. The microfluidic device according to claim 1, wherein said first shared microfluidic supply system, said second shared microfluidic supply system, or both comprises a valve for controlling the supply of said first and second fluids to said first inlets and/or second inlets respectively and wherein said valve is arranged upstream of said first inlets and/or second inlets.

5. The microfluidic device according to claim 1, wherein said at least one valve-less fluidic resistance element comprises an elongated fluid path, said larger fluidic resistance being created by said elongated fluid path.

6. The microfluidic device according to claim 1, wherein said at least one valve-less fluidic resistance element has a smaller cross-sectional area compared to a cross-sectional area of said shared first and second microfluidic supply systems, said larger fluidic resistance being created by said smaller cross-sectional area.

7. The microfluidic device according to claim 1, wherein said at least one valve-less fluidic resistance element comprises a flow resistance element having a first fluidic resistance, wherein said first fluidic resistance is larger than said fluidic resistance of said corresponding shared microfluidic supply system.

8. The microfluidic device according to claim 1, wherein said at least one valve-less fluidic resistance element comprises a diffusion plug arranged to increase a diffusion rate of reagents at said first and second inlets.

9. The microfluidic device according to claim 1, wherein said at least one valve-less fluidic resistance element comprises a flow resistance element having a first fluidic resistance and a diffusion plug having a second fluidic resistance, wherein said first fluidic resistance is larger than said second fluidic resistance.

10. The microfluidic device according to claim 9, wherein said diffusion plug is arranged downstream of said flow resistance element.

11. The microfluidic device according to claim 9, wherein a channel cross-section of said diffusion plug is larger than a channel cross-section of said flow resistance element.

12. The microfluidic device according to claim 1, further comprising a drain arranged between said at least one valve-less fluidic resistance element and its respective microreactor.

13. The microfluidic device according to claim 12, wherein said drain is a common drain for said plurality of microreactors.

14. The microfluidic device according to claim 1, wherein said at least one waste channel for draining fluid from said microreactor is in fluid connection with a common waste channel.

15. A chemical reaction sequencer apparatus comprising the microfluidic device of claim 1.

16. The chemical reaction sequencer apparatus according to claim 15, wherein said first inlets are arranged in parallel so that said plurality of microreactors are simultaneously addressed by said first inlets and wherein said second inlets are arranged in parallel so that said plurality of microreactors are simultaneously addressed by said second inlets.

17. The chemical reaction sequencer apparatus according to claim 15, wherein said plurality of microreactors are connected in parallel to said shared first and second microfluidic supply systems so that a higher pressure is applied to first and second inlets of an upstream microreactor than to first and second inlets of a downstream microreactor during supply of said first or second fluids via said shared microfluidic supply systems.

18. The chemical reaction sequencer apparatus according to claim 15, wherein said first shared microfluidic supply system, said second shared microfluidic supply system, or both comprises a valve for controlling the supply of said first and second fluids to said first inlets and/or said second inlets respectively and wherein said valve is arranged upstream of said first and/or said second inlets.

19. The chemical reaction sequencer apparatus according to claim 15, wherein said at least one valve-less fluidic resistance element comprises a flow resistance element having a first fluidic resistance and a diffusion plug having a second fluidic resistance, wherein said first fluidic resistance is larger than said second fluidic resistance.

20. A method for supplying reagents to a plurality of microreactors comprising the steps of
a) providing a microfluidic device according to claim 13, wherein said at least one valve-less fluidic resistance element comprises a diffusion plug;
b) supplying a first reagent to said plurality of microreactors via said first inlets;
c) supplying a cleaning solution to said first inlets and collecting and removing said cleaning solution in said drain before said cleaning solution reaches said microreactors;
d) supplying said cleaning solution to said drain via an inlet other than said first inlet and filling said plurality of microreactors with said cleaning solution;
e) removing fluid in said drain and reloading said diffusion plugs with said cleaning solution; and
f) supplying a second reagent to said plurality of microreactors via said second inlet.

* * * * *